US011349963B1

(12) United States Patent
Chattopadhyay et al.

(10) Patent No.: US 11,349,963 B1
(45) Date of Patent: May 31, 2022

(54) METHOD AND SYSTEM FOR DETECTING ANOMALIES OF SERVER AND CLIENT

(71) Applicant: Keysight Technologies, Inc., Santa Rosa, CA (US)

(72) Inventors: Sudipta Chattopadhyay, Burdwan (IN); Matheus Eduardo Garbelini, Paraná (BR); Francis-Bs Ngian, Singapore (SG); Cyril Tan, Singapore (SG)

(73) Assignee: Keysight Technologies, Inc., Santa Rosa, CA (US)

( * ) Notice: Subject to any disclaimer, the term of this patent is extended or adjusted under 35 U.S.C. 154(b) by 79 days.

(21) Appl. No.: 16/773,689

(22) Filed: Jan. 27, 2020

(51) Int. Cl.
*H04L 69/329* (2022.01)
*H04L 67/1001* (2022.01)
(Continued)

(52) U.S. Cl.
CPC ............ *H04L 69/16* (2013.01); *G06F 11/263* (2013.01); *G06F 11/3684* (2013.01);
(Continued)

(58) Field of Classification Search
CPC ..... H04L 67/1002; H04L 67/42; H04L 69/16; H04L 69/329; H04W 88/08;
(Continued)

(56) References Cited

U.S. PATENT DOCUMENTS 8,819,834 B2   8/2014 Petrica et al.
9,146,829 B1*  9/2015 Allen .................. G06F 11/3632
(Continued)

FOREIGN PATENT DOCUMENTS

CN   110175120 B   * 11/2020
CN   112235161 A   *  1/2021
EP     3657336 A1   *  5/2020   .......... G06F 11/3684

OTHER PUBLICATIONS

Neeraj Karamchandani, "Mutation Based Protocol Fuzzer for IoT", A Thesis in Computer Science and Engineering, The Pennsylvania State University, The Graduate School College School of Engineering, Dec. 2017, pp. 1-58.
(Continued)

*Primary Examiner* — James R Sheleheda

(57) ABSTRACT

A method is provided for finding vulnerabilities of a server and a client communicating according to a communication protocol standard. The method includes establishing a connection between the server and client according to the communication protocol standard; generating valid packets from a communication protocol model, the valid packets being compliant with the communication protocol standard; generating mutated packets by mutating the valid packets according to mutation probabilities; sending the mutated packets from the server to the client or from the client to the server during different states of the communication protocol model; receiving first responses to the mutated packets; sending invalid packets from the server to the client or from the client to the server during different states of the communication protocol model; receiving second responses to the invalid packets; and identifying anomalies of the client or server based on the received first and/or second responses.

20 Claims, 7 Drawing Sheets

(51) Int. Cl.
*G06F 11/263* (2006.01)
*G06F 11/36* (2006.01)
*H04L 69/16* (2022.01)
*H04L 67/01* (2022.01)
*H04W 88/08* (2009.01)

(52) U.S. Cl.
CPC ...... *G06F 11/3692* (2013.01); *H04L 67/1002* (2013.01); *H04L 67/42* (2013.01); *H04L 69/329* (2013.01); *H04W 88/08* (2013.01)

(58) Field of Classification Search
CPC ............. G06F 11/3684; G06F 11/3692; G06F 11/3672; G06F 11/263
See application file for complete search history.

(56) References Cited

U.S. PATENT DOCUMENTS

| | | | |
|---|---|---|---|
| 9,432,394 | B1 | 8/2016 | Lahiri et al. |
| 9,917,924 | B2* | 3/2018 | Mandal .................... H04L 69/02 |
| 10,248,522 | B1* | 4/2019 | Cain ....................... G06F 11/263 |
| 10,983,853 | B2* | 4/2021 | Godefroid .............. G06N 7/046 |
| 2013/0340083 | A1* | 12/2013 | Petrica ................... G06F 11/263 726/25 |
| 2016/0277541 | A1* | 9/2016 | Mandal ................... H04L 69/02 |
| 2018/0365139 | A1* | 12/2018 | Rajpal .................... G06N 5/003 |
| 2020/0125943 | A1* | 4/2020 | Copty .................... G06N 3/0436 |
| 2020/0364135 | A1* | 11/2020 | Hernandez .......... G06F 11/3684 |
| 2020/0394311 | A1* | 12/2020 | Li .......................... G06F 21/577 |
| 2021/0011837 | A1* | 1/2021 | Coppa .............. G01R 31/31703 |

OTHER PUBLICATIONS

Chenyang Lyu et al. "MOpt: Optimized Mutation Scheduling for Fuzzers", Proceedings of the 28th USENIX Security Symposium, Aug. 14-16, 2019, pp. 1948-1966.
Neeraj Karamchandani et al., "SMuF: State Machine Based Mutational Fuzzing Framework for Internet of Things", Pennsylvania State University, State College, 2019, pp. 101-112.
Serge Gorbunov et al., "AutoFuzz: Automated Network Protocol Fuzzing Framework", IJCSNS International Journal of Computer Science and Network Security, vol. 10 No. 8, Aug. 2010, pp. 239-245.
Greg Banks et al. "SNOOZE: Toward a Stateful NetwOrk prOtocol fuzZEr", ISC 2006, LNCS 4176, pp. 343-358.
Manuel Mendonca et al., "Fuzzing Wi-Fi Drivers to Locate Security Vulnerabilities", 2008 Seventh European Dependable Computing Conference, pp. 110-119.
Laurent Butti et al., "Discovering and Exploiting 802.11 Wireless Driver Vulnerabilities", Journal in Computer Virology, vol. 4; No. 1, pp. 25-37.
Sylvester Keil et al., "Stateful Fuzzing of Wireless Device Drivers in an Emulated Environment", Black Hat Japan, Tokyo, Oct. 25, 2007, pp. 1-45.
Joshua Pereydaet al, "boofuzz: Network Protocol Fuzzing for Humans", https://github.com/jtpereydalboofuzz, https://wpa3.mathyvanhoef.com/, Apr. 2017, pp. 1-4.
Mathy Vanhoef et al., "Discovering Logical Vulnerabilities in the Wi-Fi Handshake Using Model-Based Testing," Proceedings of the 2017 ACM on Asia Conference on Computer and Communications Security, pp. 360-371.
Simon Meier et al. "The TAMARIN Prover for the Symbolic Analysis of Security Protocols", CAV, 2013, pp. 696-701.
"Dynamic testing of any protocol, file, hardware or communication standard", beSTORM Modules, Beyond Security, https://www.beyondsecurity.com/bestorm.html, pp. 1-8.
"Defensics Fuzz Testing", Synopsys, https://www.synopsys.com/software-integrity/security-testing/fuzz-testing.html, pp. 1-4.

* cited by examiner

METHOD AND SYSTEM FOR DETECTING ANOMALIES OF SERVER AND CLIENT

BACKGROUND

Complex vulnerabilities of communications networks, including a server and one or more clients, have become prevalent. Such vulnerabilities include KRACK and Dragonslayer attacks on Wi-Fi networks (e.g., IEEE 802.11), for example. There have been limited attempts to automatically test complex systems, such as Wi-Fi, for vulnerability to attacks using fuzzing processes. However, conventional fuzzing processes for wireless communication protocol standards in particular only support testing driver implementations against buffer overflow or null pointer deference. These processes are not capable of detecting existing vulnerabilities such as KRACK and Dragonslayer, as they only support a limited number of states to fuzz, namely idle, authentication and association of the Wi-Fi protocol. They also do not uncover new non-compliant behaviors of the clients. In addition, some of the existing Wi-Fi fuzzing processes are configured manually. For example, such processes rely on test databases that capture test cases of existing vulnerabilities and test devices based on the content of the database. Therefore, such test databases need to be updated for each newly discovered vulnerability.

Accordingly, there is a need for effective procedures for testing communication protocol standards efficiently and automatically with regard to both servers and clients. Such procedures would detect existing vulnerabilities in the servers and/or clients communication via any communication protocol standard, as well as non-compliant behaviors, such as crashes.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
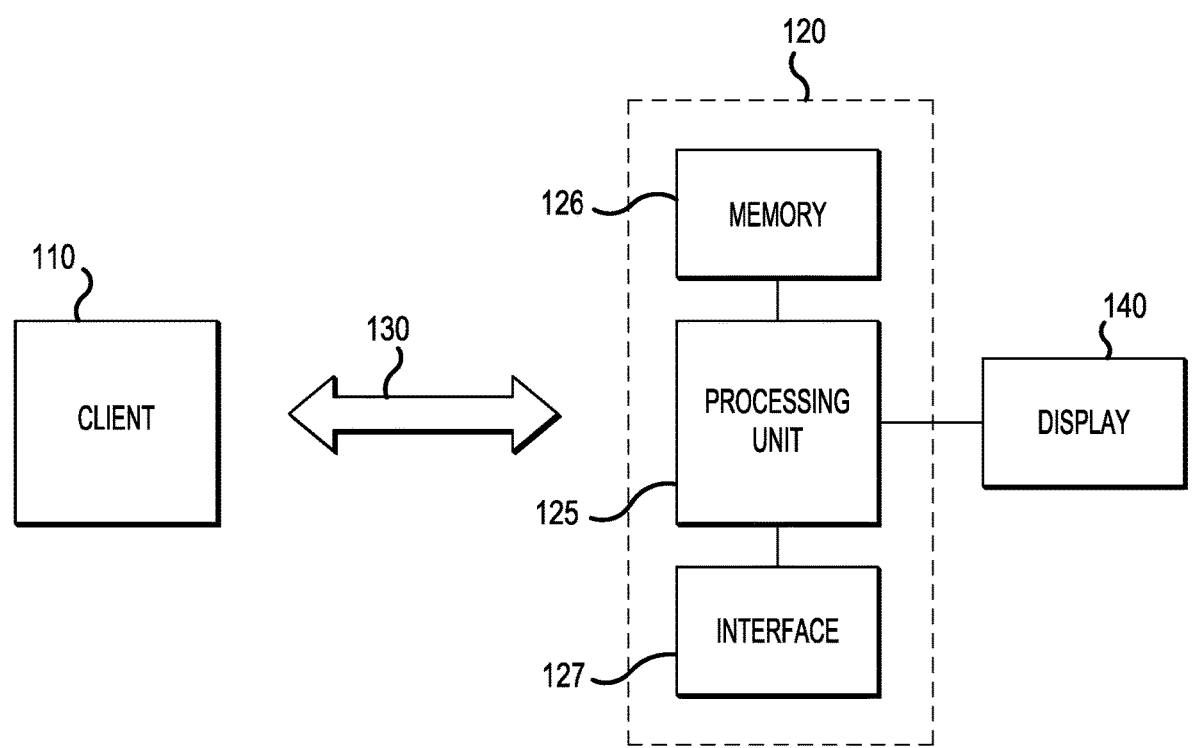
FIG. 1 is a simplified block diagram showing a communication system for detecting anomalies of a server and a client communicating according to a communication protocol standard, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a", "an" and "the" are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Various embodiments are directed to a procedure for detecting anomalies of a client or a server communicating with one another in accordance with to a communication protocol standard (e.g., Wi-Fi) using a communication protocol model. The communication protocol model systematically and automatically tests implementation of arbitrary clients (e.g., Wi-Fi clients) and servers (e.g., network access points) using a directed fuzzing methodology. Fuzzing includes automatically introducing unexpected and/or defective input to clients or servers in order to find and identify anomalies. The unexpected and/or defective input may include mutated, invalid and/or unexpected random packets, for example. When testing a client, for example, the communications protocol model automatically tests client implementations against zero-day vulnerabilities (e.g., caused by software bugs or malware), and also identifies crashes and other non-compliant behaviors, all of which may be referred to as anomalies. The communication protocol model directs fuzzing in specific states of a state machine. In response to mutated (fuzzed) packets and invalid packets, the client may be induced to exhibit anomalous behaviors that deviate from the communication protocol standard. Thus, the testing procedure not only automatically discovers known vulnerabilities, such as KRACK and Dragonslayer, for example, that would otherwise require specialized verification, but it may also uncover new non-compliant behaviors.

The testing procedure is modular and therefore may be extended for fuzzing additional communication protocol standards simply by adding corresponding communication protocol models. The testing procedure provides a holistic approach to automatically test arbitrary clients or servers, and provides a fully automated solution for fuzzing multiple layers and fields of packets, and various states of the communication protocol model.

The embodiments may be used in various scenarios. For example, the testing procedure may be used to systematically test client implementations of arbitrary clients, discovering anomalies, including existing vulnerabilities and new non-compliant behaviors of the client implementations with respect to the communication protocol standard. This is achieved by employing a comprehensive communication protocol model, including a state machine, and continuously monitors communications between the client and the server to check unexpected packets received in any state. The testing procedure may also be used to discover existing communication protocol design flaws, such as KRACK, for example, through testing the client implementations.

FIG. 1 is a simplified block diagram showing a communication system for finding vulnerabilities of a server and a client communicating according to a communication protocol standard, according to a representative embodiment.

Referring to FIG. 1, a communication system 100 includes a client 110 and a server 120 configured to communicate according to a predetermined communication protocol standard. The communication protocol standard enables the exchange of information between the server 120 and the client 110 through any of various communication layers, such as network, transport and application layers, by wired or wireless connectivity. In the depicted embodiment, the server 120 is connected to the client 110 over a wireless communication link 130, in which case the server 120 may be a network access point (AP), according to a wireless communication protocol that enables the exchange of information wirelessly via over the air transmissions. For purpose of explanation, it is assumed that the wireless protocol standard is a Wi-Fi (IEEE 802.11) protocol standard, for example. Other examples of compatible wireless and wired communication protocol standards include Bluetooth (IEEE 802.15), 4G long term evolution (LTE), 5G, transmission control protocol (TCP), transport layer security (TLS), hypertext transfer protocol (HTTP), or file transfer protocol (FTP). Also, for purposes of explanation, the testing is described from the perspective of the server 120 in order to find and identify vulnerabilities in the client 110, which may be a random client. It is understood, however, that the testing may be implemented from the perspective of the client 110 in order to find and identify vulnerabilities in the server 120 using substantially the same process in the opposite direction, without departing from the scope of the present teachings.

Various types of client 110 may be tested using various communication protocols. For example, when the communication protocol standard is the Wi-Fi protocol standard, the client 110 may be an arbitrary Wi-Fi client, such as a smartphone, a computer, a Raspberry Pi, a medical device, or an automotive device. To establish a wireless connection (e.g., using WPA2 Personal or WPA2 Enterprise), the client 110 follows the Wi-Fi protocol standard to orderly exchange packets with the server 120 (which is implemented as a network AP). Generally, the communication protocol model includes a state machine, discussed below with reference to FIG. 2. Through answering packets received from the client 110 and proactively sending out packets, the server 120 triggers state transitions. For fuzzing the client 110, the process residing in the server 120 systematically generates packets via a corresponding communication protocol model (e.g., Wi-Fi) and a test optimization algorithm, discussed below.

The server 120 may be a computer and includes a processing unit 125, memory 126, and an interface 127. The processing unit 125, together with the memory 126, implements the methods of finding vulnerabilities of a client or a server communicating according to a communication protocol standard. In various embodiments, the processing unit 125 may include one or more computer processors, digital signal processors (DSP), field-programmable gate arrays (FPGAs), application specific integrated circuits (ASICs), or combinations thereof, using any combination of hardware, software, firmware, hard-wired logic circuits, or combinations thereof. The processing unit 125 may include its own processing memory (e.g., memory 126) for storing computer readable code (e.g., software, software modules) that enables performance of the various functions described herein. For example, the memory 126 may store software instructions/computer readable code executable by the processing unit 125 (e.g., computer processor) for performing some or all aspects of methods described herein, including various operations of the methods described below with reference to FIGS. 4 and 5. That is, execution of the instructions/computer readable code generally causes the processing unit 125 to emulate and send mutated (fuzzed) and invalid packets between the AP 115 and the client 110, and to optimize mutation probabilities used for fuzzing valid packets to provide the mutated packets, for example. The instructions/computer readable code may further cause the processing unit 125 to find and identify vulnerabilities in the client 110 based on the responses or lack of responses to mutated packets and invalid packets.

References to the processing unit 125 may be interpreted to include one or more processing cores, as in a multi-core processor. The processing unit 125 may also refer to a collection of processors within a single computer system or distributed among multiple computer systems, as well as a collection or network of computing devices each including a processor or processors. Programs have software instructions performed by one or multiple processors that may be within the same computing device or which may be distributed across multiple computing devices.

The processing memory, as well as other memories and databases, collectively represented by the memory 126, as described herein may be random-access memory (RAM), read-only memory (ROM), flash memory, electrically programmable read-only memory (EPROM), electrically erasable and programmable read only memory (EEPROM), registers, a hard disk, a removable disk, tape, compact disk read only memory (CD-ROM), digital versatile disk (DVD), registers, a hard disk, a removable disk, tape, floppy disk, blu-ray disk, or universal serial bus (USB) driver, or any other form of storage medium known in the art, which are tangible and non-transitory storage media (e.g., as compared to transitory propagating signals). Memories may be volatile or non-volatile, secure and/or encrypted, unsecure and/or unencrypted, without departing from the scope of the present teachings. As mentioned above, the memory 126 is representative of one or more memories and databases, including the processing memory, as well as multiple memories and databases, including distributed and networked memories and databases.

The interface 127 may include a user interface and/or a network interface for providing information and data output by the processing unit 125 and/or the memory 126 to the user and/or for receiving information and data input by the user. That is, the interface 127 enables the user to enter data and to control or manipulate aspects of the fuzzing process, and also enables the processing unit 125 to indicate the effects of the user's control or manipulation. The interface 127 may include one or more of ports, disk drives, wireless antennas, or other types of receiver circuitry. For example, the server 120 may retrieve or otherwise receive data and instructions via the interface 127 from a website, an email, a portable disk or other type of memory, including an external database. The interface 127 may further connect one or more user interfaces, such as a mouse, a keyboard, a mouse, a trackball, a joystick, a microphone, a video camera, a touchpad, a touchscreen, voice or gesture recognition captured by a microphone or video camera, for example.

The display 140 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 140 and/or the processing unit 125 may include one or more display interface(s), in which case the display 140 may provide a graphical user interface (GUI) for displaying and receiving information to and from a user.

Figure 2:
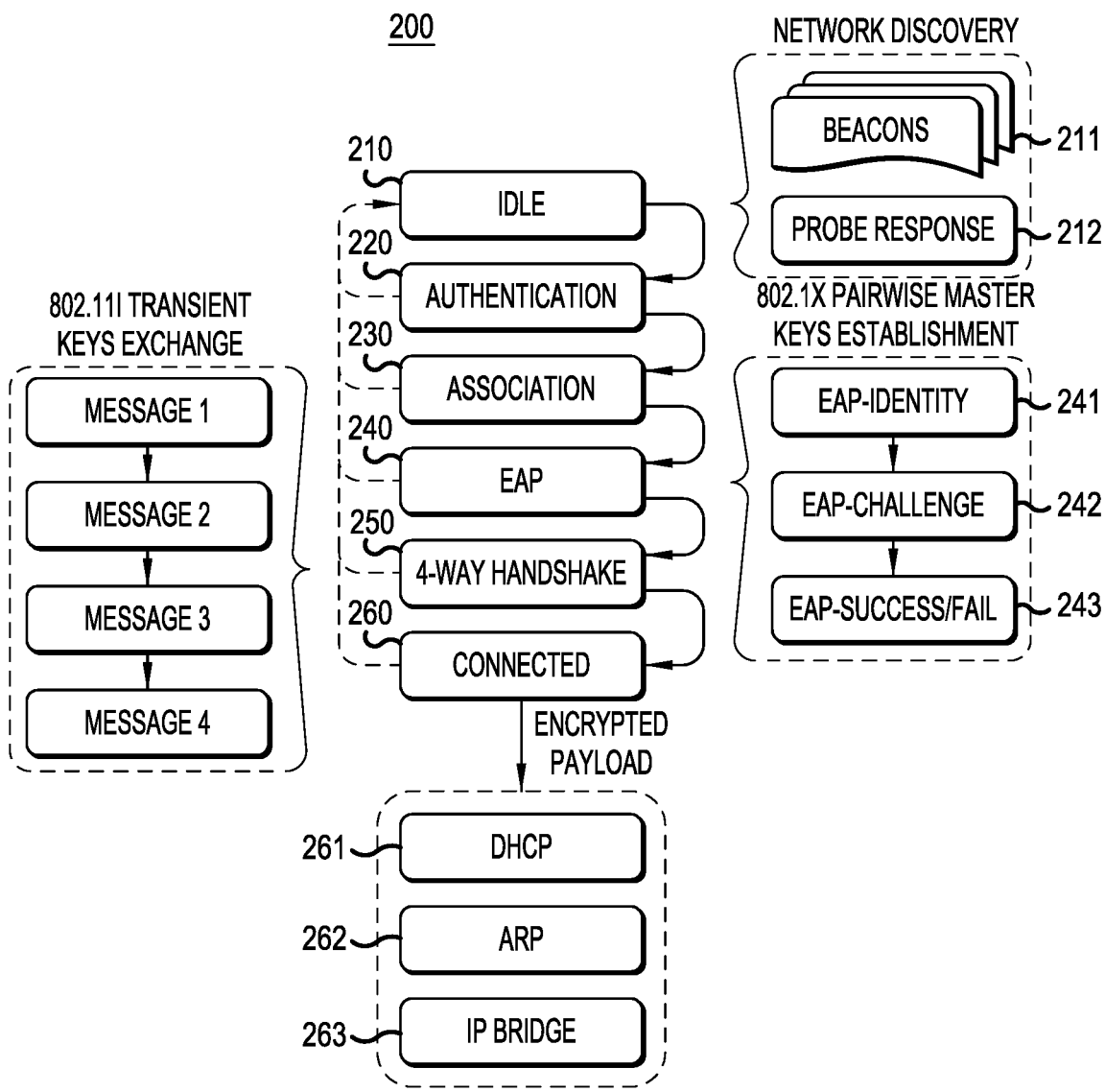
FIG. 2 is a simplified block diagram of a state machine of a communication protocol model implemented by the server for detecting anomalies in the client, according to a representative embodiment.

Notably, the client 110 likewise may be a computer and also includes a processor unit, memory and an interface (not shown), which are substantially the same as the processing unit 125, the memory 126 and the interface 127, discussed above. This enables the client 110 to perform fuzzing on the server 120 in alternative embodiments, FIG. 2 is a simplified block diagram of a state machine of a communication protocol model implemented by the server for finding vulnerabilities in the client, according to a representative embodiment. The state machine captures the core design of IEEE 802.11, for example, enabling the testing of implementations of WPA2 Personal and WPA2 Enterprise against possible undesirable Wi-Fi behaviors of the client 110, including non-compliance with the Wi-Fi protocol standard. The number and functions of states in FIG. 2 are illustrative, and may otherwise vary to provide unique benefits for any particular situation or to meet application specific design requirements of various implementations, as would be apparent to one skilled in the art.

Referring to FIG. 2, state machine 200 includes six states: idle state 210, authentication state 220, association state 230, extensible authentication protocol (EAP) state 240, four-way handshake state 250, and connected state 260. Although described as being implemented by the server 120 to perform fuzzing on the client 110, it is understood that the state machine 200 may be implemented in a similar manner by the client 110 to the extent the client 110 is to perform fuzzing on the server 120.

The idle state 210, authentication state 220 and association state 230 are the minimum states required to establish a simple open Wi-Fi connection between the client 110 and the server 120 (e.g., network AP). The open Wi-Fi connection is a non-protected, plain text communication between the client 110 and the server 120. In an embodiment, the server 120 emulates the network AP to communicate with the client 110. In the idle state 210, the server 120 actively broadcasts beacon frames 211 over a repetitive time period (e.g., every 100 ms) to announce itself towards Wi-Fi clients, including the client 110. The server 120 also sends probe responses 212 in the idle state 210 in response to probe requests sent by the client 110, e.g., when the client 110 is scanning for networks. The authentication state 220 may include two messages: an authentication request received from the client 110 in response to the beacon frame(s), and a success or failure authentication response sent by the server 120 to the client 110. For example, when the authentication request from the client 110 is determined to be valid, the server 120 responds with a success authentication response, and transitions to the association state 230. Otherwise, the server 120 remains in the authentication state 220, which may eventually time out, returning the server 120 to the idle state 210. The association state 230 similarly may include two messages: an association request received from the client 110 and an association response sent by the server 120. In the association state 230, the server 120 must receive a correct association request from the client 110. For example, when the association request from the client 110 is determined to be valid, the server 120 responds with a success association response, and transitions to the EAP state 240. Otherwise, the server 120 remains in the association state 230, which may eventually time out, returning the server 120 to the idle state 210.

In the EAP state 240, the server 120 begins an EAP exchange with the client 110, e.g., using WPA2 Enterprise. In an embodiment, the Wi-Fi protocol model handles three EAP sub-states: EAP-identity sub-state 241, EAP-challenge sub-state 242, and EAP-success/fail sub-state 243. While the EAP-identity sub-state 241 and the EAP-success/fail sub-state 243 are relatively simple messages to construct, EAP-challenge messages in the EAP-challenge sub-state 242 require use of multiple cryptographic algorithms (e.g., elliptic curve cryptography). When the server 120 enters EAP state 240, it automatically transitions to EAP-identity sub-state 241 and sends an EAP identity request to the client 110.

The server 120 transitions to the EAP-challenge sub-state 242, and sends an EAP-challenge request to the client 110. The EAP-challenge request is generated based on methods according to EAP-PWD, EAP-PEAP, EAP-TLS and/or EAP-TTLS protocols, known to one skilled in the art. Each of these protocols defines a cryptographic algorithm to be used to exchange a secret shared key between the server 120 and the client 110, called a pairwise master key (PMK). The specific EAP protocol used during the EAP-challenge sub-state 242 is previously configured in the server 120 and the client 110, both of which must support (i.e., agree on) a common EAP protocol. The client 110 sends a successful EAP-challenge response to the server 120 when it considers the EAP-challenge request from the server 120 correct according to the agreed upon EAP protocol in EAP-challenge sub-state 242.

When the client 110 sends an invalid EAP-challenge response, the server 120 transitions to the EAP-success/fail sub-state 243 indicating a failure. When either of the EAP-TLS or EAP-TTLS protocol is selected, certificates must be previously configured in both the server 120 and the client 110, otherwise, the EAP-challenge sub-state 242 transitions to the EAP-success/fail sub-state 243 indicating a failure. When the client 110 receives an invalid EAP-challenge request from the server 120, the server 120 eventually times out and transitions to idle state 210. Upon receiving the successful EAP-challenge response from the client 110, the server 120 transitions to the EAP-success/fail sub-state 243 with a success indication and transitions to the four-way handshake state 250. Otherwise, when a failure indication is received in the EAP-success/failure sub-state 243, the server 120 transitions to the idle state 210. When a success indication is received, both the client 110 and the server 120 share a PMK, which is used to generate a pairwise transient key (PTK).

The server 120 then transitions to the four-way handshake state 250, which is needed for both WPA2-Personal and WPA2 Enterprise, for example. In the four-way handshake state 250, four corresponding messages are exchanged between the server 120 and the client 110 with the goal of establishing a PTK, as known to one skilled in the art. The PTK is derived from the PMK during the four-way handshake state 250. The four messages for the PTK exchange are indicated in FIG. 2 as message 1, message 2, message 3, and message 4. This set of messages has the goal of verifying when both the server 120 and the client 110 have the correct PMK, so that a valid PTK may be derived from the correct PMK. The PTK enables the server 120 to encrypt/decrypt data to or from the client 110 after the connected state 260 is reached.

The server 120 transitions to the connected state 260 in which the client 110 connects to the Internet via the server 120, and data packets may be exchanged between the server 120 and the client 110. All such data packets may be encrypted, for example, as discussed above. Notably, the Wi-Fi protocol model systematically generates fuzzed packets until the four-way handshake state 250 is complete.

Figure 3:
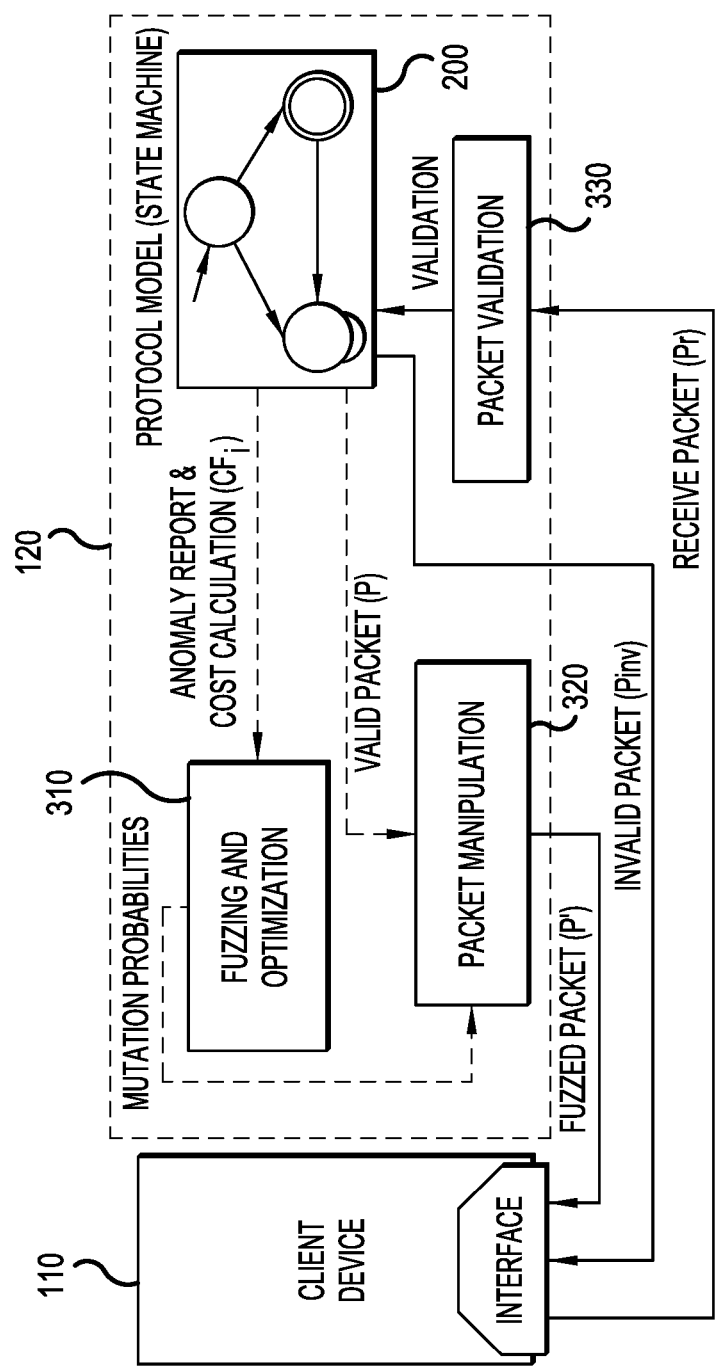
FIG. 3 is a simplified block diagram showing a high-level workflow of the protocol testing procedure, according to a representative embodiment.

FIG. 3 is a simplified block diagram showing a high-level workflow of the protocol testing procedure, according to a representative embodiment.

Referring to FIG. 3, the server 120 is shown in communication with the client 110 via a Wi-Fi interface by execution of the state machine 200, as discussed above. In addition to the state machine 200, the server 120 includes three major modules, which may be implemented as self-contained computer programs (or distinct portions of a computer program) comprising computer code executable by the processing unit 125, for example. The modules include a fuzzing and optimization module 310, a packet manipulation module 320, and a packet validation module 330, each of which may be implemented as software instruction and/or modules, for example.

The state machine 200 is configured to output valid packets (P) to the packet manipulation module 320, where each valid packet meets the packet criteria of the communication protocol standard (e.g., Wi-Fi in this example). The valid packets may be sent to the packet manipulation module 320 in the various states of the state machine 200 shown in FIG. 2, for example.

The state machine 200 is further configured to output invalid packets ($P_{inv}$) to the client 110, where each invalid packet fails to meet packet or other criteria of the communication protocol model. An invalid packet may be a valid packet previously provided by the state machine 200 and stored as an historical packet ($P_{hist}$) in a database (e.g., memory 126), and thus the invalid packet may be retrieved from a history of sent valid packets. For example, the invalid packet may be invalid with respect to the current state of the state machine 200, meaning that it was originally generated for sending during a different state than that in which the state machine 200 currently operates. Because the invalid packet is not valid, the client 110 should not respond, and the server 120 eventually returns to the idle state 210 (e.g., ending a fuzzing iteration), or the client 110 may respond with a rejection packet, for example, indicating receipt of the invalid packet. For purposes of description herein, a response by the client 110 to an invalid packet may include a passive response (i.e., no response) or an active response (i.e., returning a rejection packet).

In an embodiment, the fuzzing and optimization module 310 is configured to perform particle swarm optimization (PSO), for example. Generally, the PSO is an iterative algorithm that modifies current mutation probabilities based on cost function values. That is, the PSO takes as input (the particle of the swarm) the mutation probabilities and evaluates its score based on a cost function value. Then, the PSO tries to maximize the value of such cost function by changing the values of the mutation probabilities. The fuzzing and optimization module 310 uses the PSO to generate subsequent mutation probabilities, which effectively assign weights to various layers and/or fields of valid packets to reflect the vulnerabilities of those layers and/or fields to being attacked. The PSO is described in more detail below with reference to FIG. 4. The fuzzing and optimization module 310 is also be configured to receive an anomaly report and cost calculation from the state machine 200 upon completion of the fuzzing process. The anomaly report includes information about detected anomalies, such as the state and time at which non-compliant behavior is detected by the server 120, as well as all the packets exchanged between the server 120 and the client 110 during the fuzzing iteration. The cost calculation includes factors such as transition occurrence, anomaly period, anomaly count and/or iteration time, which may be evaluated to determine the values of the cost functions, as discussed below with reference to FIG. 4.

The packet manipulation module 320 is configured to mutate (fuzz) valid packets (P) output by the state machine 200 in accordance with the mutation probabilities provided by the fuzzing and optimization module 310, and to send the mutated packets (P') to the client 110. That is, the state machine 200 generates and sends the valid packets to the packet manipulation module 320, which mutates the valid packets using the mutation probabilities. The packet manipulation module 320 is based on a communication protocol model for generating valid packets and a set of mutation probabilities for probabilistically modifying content of the valid packets. The communication protocol model is generated, and the mutation probabilities are initialized by the fuzzing and optimization module 310 before fuzzing iterations by the packet manipulation module 320 begin.

More particularly, the packet manipulation module 320 mutates the layers and/or fields of valid packets to generate mutated packets according to mutation probabilities X in a set of mutation probabilities $X_i$, where i is an integer number indicating the fuzzing iteration in a total number of fuzzing iterations I of the protocol testing, discussed below. The set of mutation probabilities $X_i$ is considered to be one element in a population or swarm of mutation probabilities $[[X]]_g$. The individual set of mutation probabilities $X_i$ belonging to the mutation probability swarm $[[X]]_g$ captures the mutation probabilities associated with all the states (states 210-260) in the state machine 200. Accordingly, the packet manipulation module 320 is able to mutate the valid packets in different fashions using the set of mutation probabilities $X_i$, thus helping to maintain diversity of the mutated packets and directing the focus of mutation to multiple protocol layers in a fuzzing iteration, as discussed below.

The packet validation module 330 is configured to perform packet validation on receive packets ($P_r$) received from the client 110 in response to the mutated packets in order to validate the correctness of receive packets. For example, the server 120 may be at the idle state 210 of the state machine 200, waiting for the client 110 to communicate with it. Once the server 120 receives a receive packet from the client 110, the packet validation module 330 automatically checks whether the receive packet is expected in accordance with the communication protocol model. With the receive packet, the server 120 may make an appropriate state transition in accordance with the communication protocol model, and the state machine 200 may generate another valid packet from a current state, where the valid packet is sent to the packet manipulation module for fuzzing, as discussed above. This process is repeated to provide multiple mutated packets for each fuzzing iteration.

The process is repeated to provide a number of mutated packets and a corresponding number of invalid packets to the client 110 for one fuzzing iteration. Before proceeding to the next fuzzing iteration, the mutation probabilities are refined by the fuzzing and optimization module 310, e.g., using the PSO, which inputs the current mutation probabilities and the value of a cost function measured during the communication with the client 110. Different sets mutation probabilities $X_i$, may result in different mutated packets, thus leading to different costs (e.g., the number of transitions covered in the communication protocol model), where a cost function $CF_i$ corresponding to the set of mutation probabilities $X_i$, belongs to a set of cost functions $[[CF]]_i$ for each fuzzing iteration. The aim is to automatically maximize or minimize the value of the cost function $CF_i$ over increasing numbers of iterations by refining the set of mutation probabilities $X_i$ following each iteration. This refined set of mutation probabilities $X_i$ is used in the next fuzzing iteration to uncover anomalies in the protocol implementation.

Figure 4:
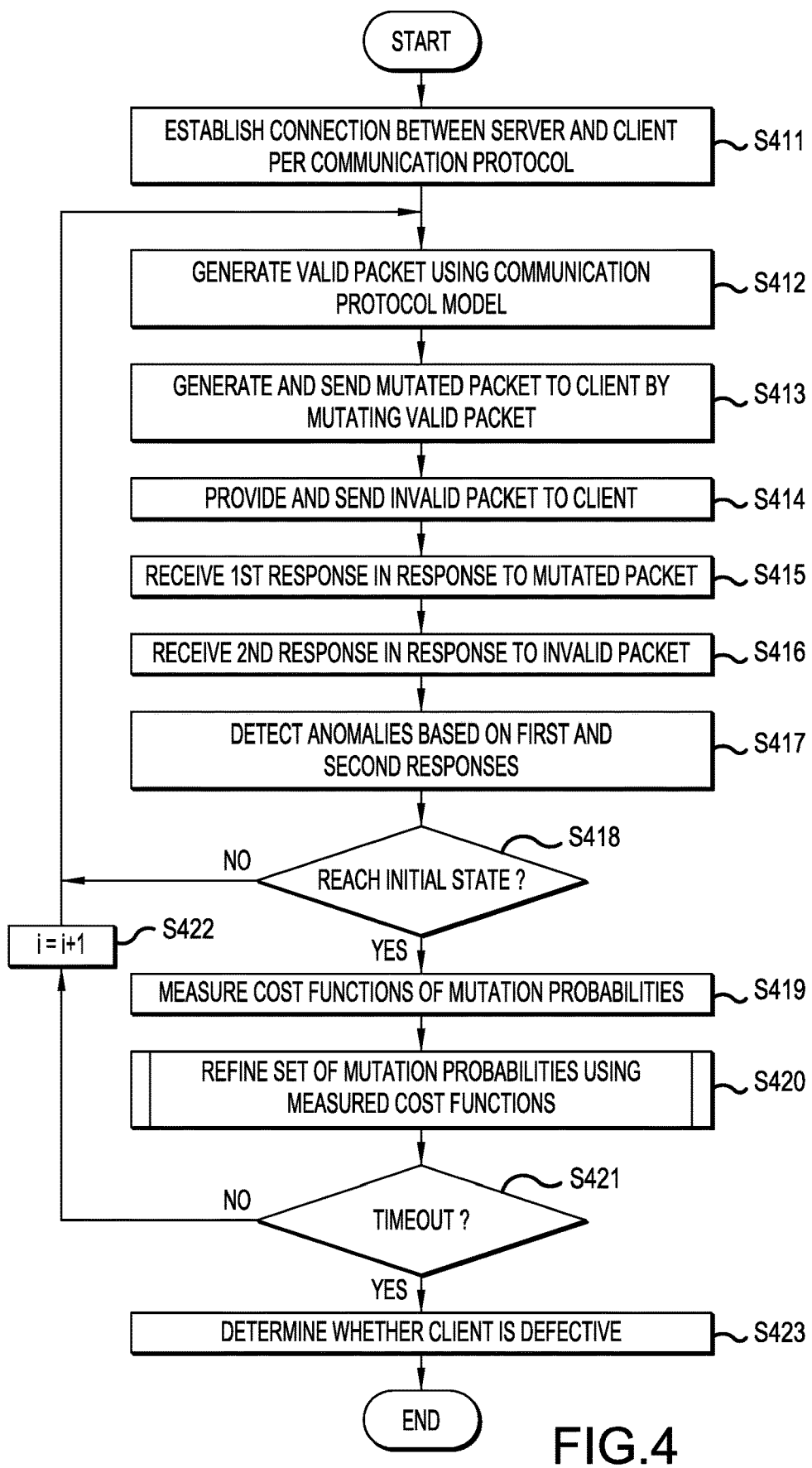
FIG. 4 is a simplified flow diagram depicting a method of detecting anomalies of a server and a client communicating according to a communication protocol standard, according to a representative embodiment.

FIG. 4 is a simplified flow diagram depicting a method of finding vulnerabilities of a server and a client communicating according to a communication protocol standard, according to a representative embodiment. The method is described from the perspective of a server (e.g., server 120) fuzzing a client (e.g., client 110) to find vulnerabilities of the client, although it is understood that the method likewise may be applied from the perspective of a client fuzzing a server to find vulnerabilities of the server, without departing from the scope of the present teachings.

Referring to FIG. 4, the method begins with establishing a connection between the server and the client according to the communication protocol standard in block S411. For example, when the communication protocol standard is a Wi-Fi protocol standard, the connection may be established as discussed above with reference to FIG. 2. That is, the connection may be established by broadcasting a beacon in an idle state; receiving an authentication request from the client in response to the client receiving the beacon, and sending a success authentication response to the client in an authentication state; and receiving an association request from the client, and sending a success association response in an association state. In addition, completing the connection may include performing an EAP challenge and a four-way handshake, known to one skilled in the art.

In block S412, the server generates a valid packet using a communication protocol model, where the valid packet is compliant with the communication protocol standard. The valid packet includes multiple layers, and each layer includes multiple fields. Since communication protocol standards may typically be modeled as a state machine, the communication protocol model may likewise be modeled to resemble this state machine. The communication protocol model is leveraged automatically to speculate about the state in which the client is exchanging packets, to generate and mutate packets, and to validate response packets received from the client to check the occurrence of an anomaly (e.g., vulnerability or non-compliant behaviors), as discussed below. The communication protocol model may be manually implemented, for example, according to the IEEE 802.11, 802.11i or 802.1X standard, as known to one skilled in the art.

In block S413, a mutated packet is generated by mutating (or fuzzing) the valid packet according to a set of mutation probabilities $X_i$, and sent to the client, along with the valid packet and/or other valid packets. The objective of the mutation is to create scenarios that are likely to reveal vulnerabilities and/or lead to non-compliant behaviors by the client, including crashes, for example. The valid packets generated from the communication protocol model have fairly complex structures. As mentioned above, each valid packet includes multiple layers and each such layer may include multiple fields. Accordingly, the mutation may occur at two levels of the valid packet: the layer level and the field level. The set of mutation probabilities $X_i$ includes mutation probabilities associated with the layers of the valid packet and/or mutation probabilities associated with the fields of each layer for all the states of the communication protocol model.

The number of mutation probabilities in each set of mutation probabilities $X_i$ may be determined, for example, based on the number of layers in each valid packet and the number of states of the communication protocol model. That is, assuming $L_P$ indicates the set of layers associated with a valid packet P, and for each layer l belonging to the set $L_P$, $F_l$ indicates the set of associated fields in that layer l. Each layer l is associated with a layer mutation probability $pr_l^+$, which captures the probability of mutating the layer l of the packet P. Also, a field mutation probability $pr_l^-$ is associated with each layer l belonging to the set $L_P$. The communication protocol model mutates any field f belonging to $F_l$ with the field mutation probability $pr_l^-$, and each valid packet P is associated with a protocol state s belonging to a set of available state S (e.g., shown in FIG. 2). Therefore, the number of mutation probabilities is bounded by $(2 \times \Sigma_{s \in S} L_s)$, where S is the total number of states in the communication protocol model and $L_s$ is the number of layers associated with the valid packet P in state s. Thus, each set of mutation probabilities $X_i$ captures a set of $(2 \times \Sigma_{s \in S} L_s)$ mutation probabilities. Stated differently, each mutation probability in a set of mutation probabilities $X_i$ is a vector having a length $(2 \times \Sigma_{s \in S} L_s)$.

Figure 5:
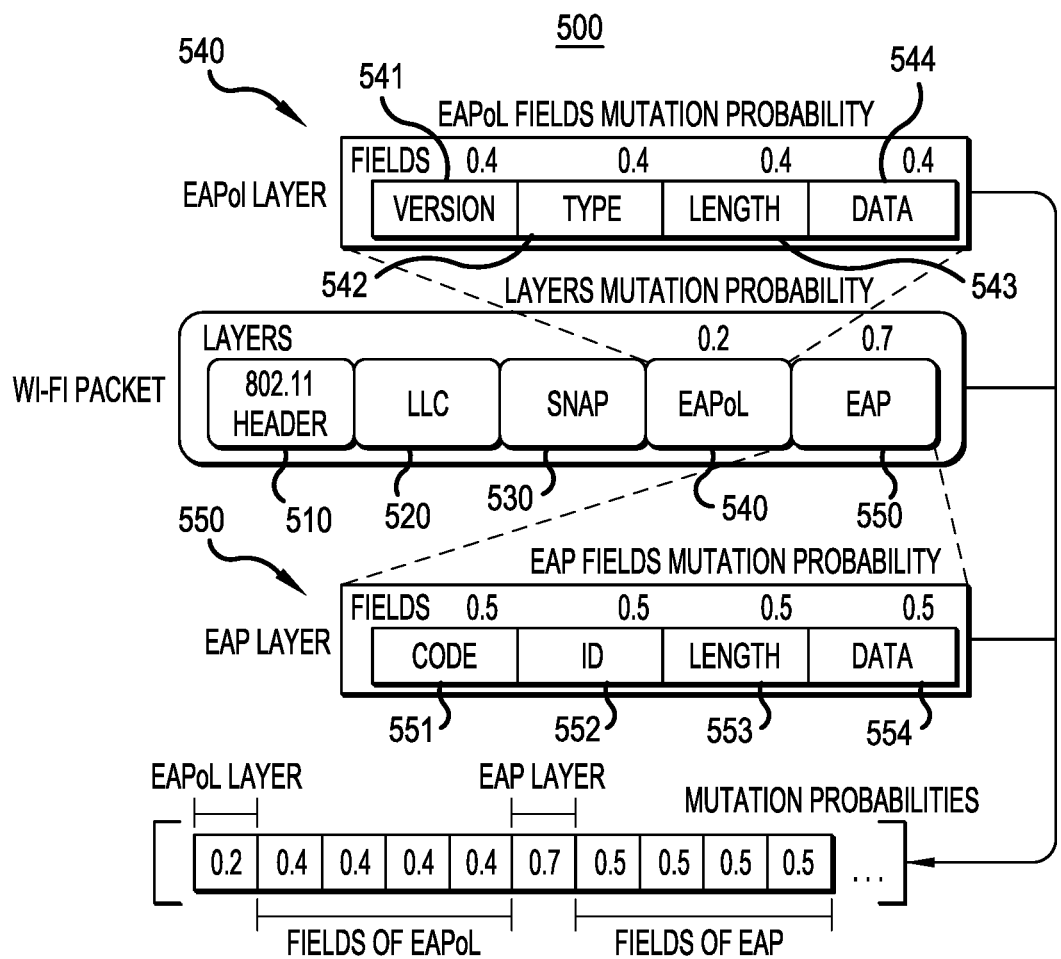
FIG. 5 is a schematic diagram of an illustrative valid packet, including representative layers and fields with corresponding mutation probabilities, according to a representative embodiment.

FIG. 5 is a schematic diagram of an illustrative valid packet, including representative layers and fields with corresponding mutation probabilities, according to a representative embodiment.

Referring to FIG. 5, a valid Wi-Fi packet 500 includes five different layers, including a header layer 510, a logic link control (LLC) layer 520, a subnetwork access protocol (SNAP) layer 530, an EAP over LAN (EAPoL) layer 540 and an EAP layer 550. Each of the five layers has an associated probability of being mutated by the communication protocol mode. These mutation probabilities may be initially assigned by a user or based on a reference of common vulnerability exposures (CVEs), known to one skilled in the art. In the depicted example, the EAPoL layer 540 is assigned a mutation probability of 0.2 and the EAP layer 550 is assigned a mutation probability of 0.7, meaning that the communication protocol model is more likely to mutate the EAP layer 550 than the EAPoL layer 540. The mutation probabilities may be customized to detect certain vulnerabilities that are known to target certain layers, or to which certain layers are known to be vulnerable. This accelerates the fuzzing process to discover anomalous behaviors of the client. For example, the EAP layer 550 is generally susceptible to Dragonslayer, so in order to focus on detecting Dragonslayer, the protocol communication model assigns a higher mutation probability of 0.7 to the EAP layer 550 than to the EAPoL layer 540, for example, which is not particularly susceptible to Dragonslayer. That is, a layer with a higher mutation probability means that it is more frequently mutated by the protocol communication model than other layers of the packet. This means that the protocol communication model is more likely to mutate layers that have been known to embrace certain vulnerabilities, and expects implementation of the client to be more likely to exhibit non-compliant behaviors at these mutated layers.

Each layer in turn contains a set of fields. In the depicted example, the EAPoL layer 540 includes four representative fields, version field 541, type field 542, length field 543 and data field 544, each of which has been assigned a mutation probability of 0.4. The EAP layer 550 also has four representative fields, code field 551, ID field 552, length field 553, and data field 554, each of which has been assigned a mutation probability of 0.5. Although the same mutation probability has been assigned to each field with in the EAPoL layer 540 and the EAP layer 550, respectively, the different fields may have different mutation probabilities without departing from the scope of the present teachings.

Therefore, in order to generate the mutated packet by mutating (fuzzing) the valid packet, a layer mutation probability is assigned to each layer of the multiple layers in the valid packet, and a field mutation probability is assigned to each field of the multiple fields in each layer in the valid packet. Then, referring again to step S413 in FIG. 4, the layers in the valid packet are mutated according to the layer mutation probability assigned to each layer, and the fields in each layer are mutated according to the field mutation probability assigned to each field, using at least one mutation operator. Assigning the layer mutation probability and assigning the field mutation probability may be done randomly, may be performed by the user, or may be based on a CVE to a known vulnerability, as discussed above.

In various embodiments, each mutation operator used to mutate the fields may include a random byte operator, a zero filling operator, and/or a bit setting operation, for example. A random byte operator assigns a randomly generated value to each byte in a selected field of the packet, in order to induce stochastic behavior. A zero filling operator overwrites each byte in the field with all zeros in order to induce potential buffer underflow during the sending and receiving of mutated packets. A bit setting operator sets a most significant bit in one or more bytes in the field to a high value in order to incur potential buffer overflows.

So, given a valid packet generated from the communication protocol model in block S412, the fields for each layer 1 of the valid packet are mutated according to the corresponding probabilities attributed to the layer mutation probability $pr_1^+$ and the field mutation probability $pr_1^-$. Once it has been determined to mutate a particular packet field, one of the mutation operators (random byte, zero filling or bit setting) may be chosen at random for the task, to provide a corresponding mutated packet.

Referring again to FIG. 4, an invalid packet is retrieved by the server and sent to the client in block S414. The invalid packet may be an historical packet, for example, which is a normal packet that has been previously sent by the server to the client. The historical packet may be retrieved from a database of historical packets. For example, the invalid packet is invalid from the aspect of being a packet that the client would not expect to receive according to the communication protocol standard (and is therefore not within the normal operations of the communication protocol standard). For example, the invalid packet may be a packet that should be sent in a state different from the state in which the server is currently operating. Alternatively, the invalid packet may be sent redundantly or at the wrong time to the client. The mutated packet and the invalid packet may be sent at the same time, or at different times, and may be sent during any of the different states of the communication protocol model.

In block S415, a first response may be received from the client in response to the mutated packet. The first response may be a client packet, for example, which may be validated by comparing a type of the client packet to an expected type according to the communication protocol standard and the state of the communication protocol model corresponding to when the client packet is received. The first response may be used to advance the state machine. In block S416, a second response may be received from the client in response to the invalid packet. Since the invalid packet is unexpected, an appropriate second response from the client may be inaction or receipt of a rejection packet. For example, the client may not send client packets of any sort in response the invalid packet, since the invalid packet would not be recognized. In this example, receiving the second response includes the server waiting a predetermined response period, after which the second response is deemed to be inaction when no packets are received, which is the valid response. Any client packet, e.g., other than a rejection packet, otherwise received during this response period would be considered an invalid response by the client. Another type of second response would expressly indicate an anomaly that may be a vulnerability in the client. For example, the Dragonslayer vulnerability can be identified when the client responds to an invalid EAP-challenge message using the EAP-PWD protocol.

In block S417, the server checks for (detects) anomalies in the client based on the first and second responses. Anomalies refer to existing vulnerabilities in the client and new non-compliant behaviors, including crashes. For example, it may be determined whether the client's implementation of the communication protocol standard causes the client to exhibit non-compliant behavior that deviates from the communication protocol standard or crashes the client. An anomaly of the client may be determined when the type of the client packet received as a first response in block S415 does not match the expected type, according to the communication protocol model. Anomalies may be detected, at least in part, by the packet validation module 330, discussed above.

For example, determining whether the client is defective includes checking whether client packets received from the client are compliant with the state of the communication protocol model. That is, a predefined set of expected client packets may be assigned to each state. When a client packet is received as the first response from the client, its type is compared to the set of expected client packets assigned with the current state of the communication protocol model. Any mismatch is deemed to be an anomaly. To discover crashes, in particular, it is determined whether the communication process performed at the client has stopped. In addition, various types of clients may send a customized packet or message to indicate a crash during communication.

In block S418, it is determined whether the communication protocol model running at the server has reached an initial state, such as the idle state 210 shown in FIG. 2. That is, the communication protocol model advances through various states, e.g., of the state machine 200, as it is generating and sending mutated packets and invalid packets to the client. One iteration of this stage of the process is defined by the communication protocol model advancing through a predetermined number of the states, and returning to the initial state. When it is determined in block S418 that the communication protocol model has not reached the initial state (block S418: no), the process returns to block S412 to generate another valid packet, and repeats the process though blocks S413-S417 for the next iteration.

When it is determined that the communication protocol model has reached the initial state (block S418: yes), cost functions $CF_i$ is measured for the set of mutation probabilities $X_i$ in block S419, resulting in a corresponding set of cost functions $[[CF]]_i$ for each fuzzing iteration. The set of cost functions $CF_i$ indicate the effectiveness of the set of mutation probabilities $X_i$ applied to generate the mutated packets for identifying vulnerabilities in the client. Generally, the lower the value of a cost function, the more efficient the corresponding mutation probability. The cost functions are employed to systematically refine the mutation probabilities, discussed below.

The cost functions may include, for example, one or more of transition occurrence, anomaly period, anomaly count and iteration time, which may be evaluated to determine the values of the cost functions. The transition occurrence counts the number of state transitions occurring in the server at the end of the fuzzing iteration. The number of such transitions is counted until the communication protocol model returns the initial state, as discussed above. The cost function is chosen to maximize the number of state transitions that may potentially discover more anomalous behavior across all states. The anomaly period captures the elapsed time between two discovered anomalies. The anomaly period cost function value is minimized to ensure that communication protocol model converges more quickly to the potential anomalous states (states in which detected anomalies occur). The anomaly count determines the number of unique anomalies that are detected, including anomalies indicated by the first and second responses received from the client. The anomaly count cost function value is maximized to increase the detection of potential anomalies. The iteration time is the amount of time for the communication protocol model to return to its initial state after initiating a communication (i.e., the time it takes to complete the repeated execution of blocks S412 through S418). The iteration time cost function value is minimized to do stress testing of the client, for example. That is, the client is more likely to crash while attempting to frequently re-interact with the server.

In block S420, the set of mutation probabilities $X_i$ is refined using the set of measured cost functions to provide a set of refined mutation probabilities $X_{i+i}$. That is, one or more of the layer mutation probabilities and the field mutation probabilities in the set of mutation probabilities $X_i$ may be altered based on the associated cost functions in a manner that attempts to steer the cost functions toward more optimized values in the subsequent fuzzing iteration. For example, the mutation probability of the EAPoL layer 540 may be increased from 0.2 to 0.4 as a result of the refinement, thereby increasing the likelihood that the EAPoL layer 540 of the valid packet will be mutated in block S413 during the next fuzzing iteration. The cost function values are measured in block S419 for the mutation probabilities applied during each respective fuzzing iteration, and the set of refined mutation probabilities may be generated in block S420 for the next fuzzing iteration based in part on the measured cost function value. This results in different sets of mutated packets being generated in block S413.

In block S421, it is determined whether to continue the fuzzing process. For example, the process may timeout at a predetermined time, and the vulnerability testing results will be output using the latest iteration of the cost function and the set of mutation probabilities $[[X]]_i$. Alternatively, the process may end when cost function values reach predetermined target values, or when a predetermined number of iterations has been performed. Of course, other methods of determining when to terminate the vulnerability testing may be implemented, without departing from the scope of the present teachings. When it is determined that the process has not yet timed out (block S421: no), the iteration i is incremented in block S422, and process returns to block S412 to begin the next iteration between blocks S412 and S421. In an alternative embodiment, the process may return to block S411, where the connection is again established between the server and the client, to between the next iteration. When it is determined that the process has timed out (block S421: yes), it is determined whether the client is defective in block S423 based on the anomalies, if any, identified in block S417 using the must current version of the set of refined mutation probabilities during each of the fuzzing iterations. The client is determined to be defective when the fuzzing leads to responses by the client indicative of vulnerabilities and non-compliant behaviors, including crashes, for example.

Figure 6:
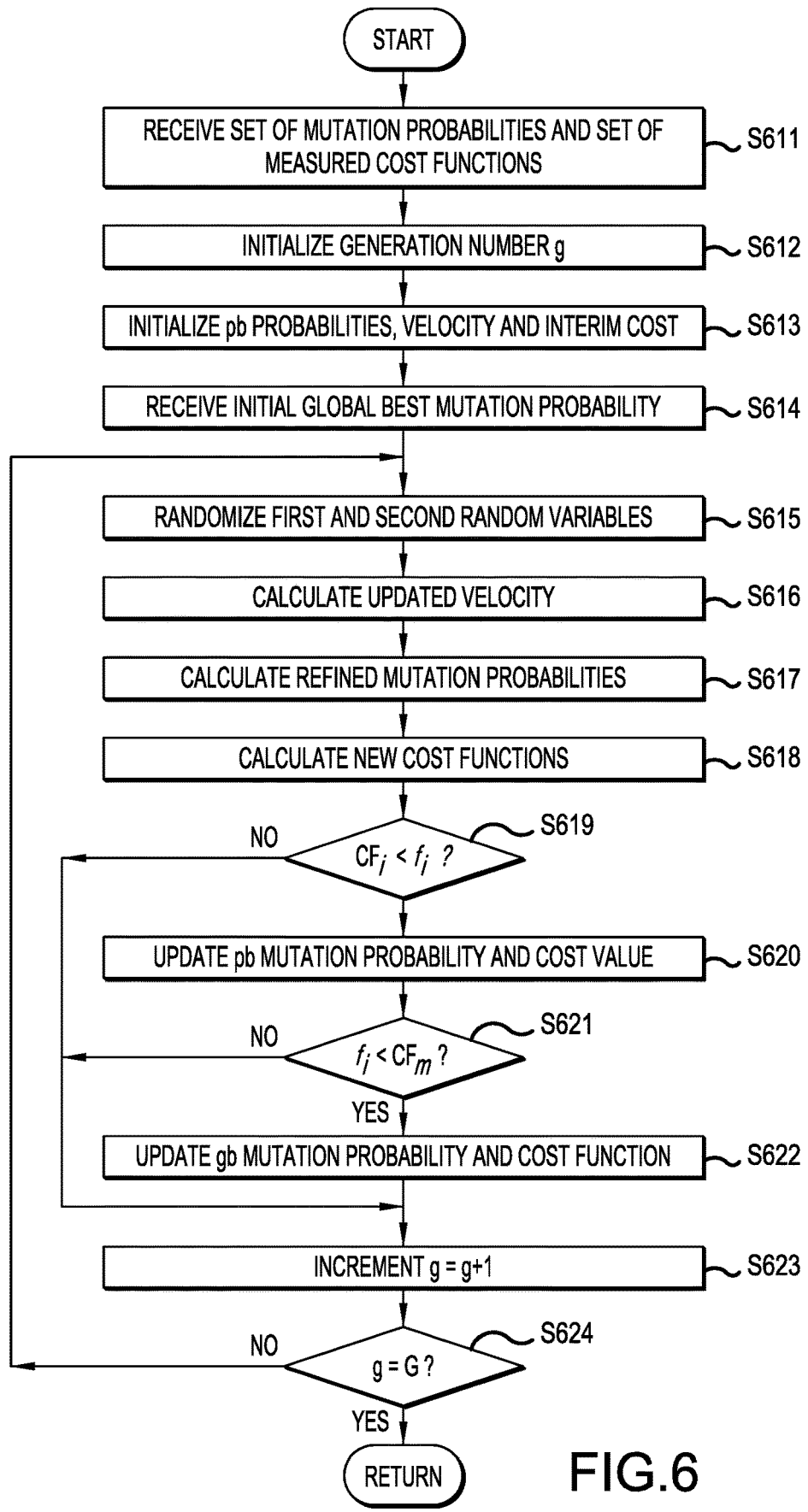
FIG. 6 is a simplified flow diagram depicting a method of refining the sets of mutation probabilities for detecting anomalies of a server and a client communicating according to a communication protocol standard, according to a representative embodiment.

FIG. 6 is a simplified flow diagram depicting a method of refining the set of mutation probabilities for finding vulnerabilities of a server and a client, according to a representative embodiment. The method is an example of the process indicated in block S420 in FIG. 4 involving particle swarm optimization. Again, the method is described from the perspective of a server (e.g., server 120) fuzzing a client (e.g., client 110) to find vulnerabilities of the client, although it is understood that the method likewise may be applied from the perspective of a client fuzzing a server to find vulnerabilities of the server, without departing from the scope of the present teachings.

The overall objective of refining the mutation probabilities is to minimize or maximize a chosen cost function value for each subsequent fuzzing iteration. In the depicted embodiment, the mutation probabilities are refined or fine-tuned using particle swarm optimization, as mentioned above, which performs well for the non-linear and stochastic behavior typically present in the communication protocol model.

Generally, the set of mutation probabilities $X_i$, in any given fuzzing iteration i, is captured as a particle of a swarm for the PSO. As discussed above, the set of mutation probabilities $X_i$ is a vector having a length $(2 \times \Sigma_{s \in S} L_s)$. Therefore, according to the PSO, each set of mutation probabilities $X_i$ may be represented as a particle that moves around in a $(2 \times \Sigma_{s \in S} L_s)$ dimensional space. The purpose of the PSO is to optimize the value of a chosen cost function by regulating the positions of the swarm of particles within the $(2 \times \Sigma_{s \in S} L_s)$ dimensional space. Since the positions of the particles are captured by the mutation probabilities, the mutation probabilities are refined using the PSO for the cost function. The refinement of the mutation probabilities is influenced by three variables: personal best mutation probabilities $pb_i$, velocities $v_i$, and global best mutation probabilities gb for the entire swarm of mutation probabilities $[[X]]_g$. Each velocity $v_i$ is an offset used to modify a corresponding set of mutation probabilities, whereas the personal best mutation probabilities $pb_i$ and the global best mutation probabilities gb effectively act as memories to direct the search process towards the optimal cost function value.

In addition, the refinement of the mutation probabilities is further influenced by three configuration parameters: inertia component w, cognitive component $\eta_1$ and social component $\eta_2$. The inertia component w controls the speed in a direction that a set of mutation probabilities (particle) $X_i$ is originally heading before the refinement. At each iteration, the set of mutation probabilities $X_i$ is moving in a direction based on the cost function, where the extent of change between iterations indicates the speed. The cognitive component $\eta_1$ increases the tendency of the set of mutation probabilities (particle) $X_i$ to follow its personal best mutation probability $pb_i$, and the social component $\eta_2$ increases the tendency of the set of mutation probabilities (particle) $X_i$ to follow the global best mutation probability gb in the swarm (i.e., population) of mutation probabilities $[[X]]_g$. For purposes of illustration, the default value of the inertia component w may be set to 0.729, the default value of the cognitive component $\eta_1$ may be set to 2.05, and the default value of the social component $\eta_2$ may be set to 2.05, and the total number of generations may be set to 200, for example. Each generation may correspond for to 5 fuzzing iterations, for example. Of course, the component and iteration values vary to provide unique benefits for any particular situation or to meet application specific design requirements of various implementations, as would be apparent to one skilled in the art.

Referring to FIG. 6, the set of mutation probabilities $X_i$, and the set of measured cost functions $[[CF]]_i$ for the current fuzzing iteration are received in block S611. In block S612, a generation number g is initialized to 0, and a swarm of mutation probabilities $[[X]]_g$ is populated using the set of mutation probabilities $X_i$. Also, for each set of mutation probabilities $X_i$ in the swarm of mutation probabilities $[[X]]_g$, a personal best mutation probability $pb_i$, a velocity $v_i$, and a cost function value $f_i$ are initialized in block S613. For example, the personal best mutation probability $pb_i$ is set to the set of mutation probabilities $X_i$, the velocity $v_i$ is set to 0, and the cost function value $f_i$ is set to the measured cost function $CF_i$.

In block S614, the initial global best mutation probability gb is received after calculating the score of the initial swarm of mutation probabilities $[[X]]_g$. The global best mutation probability gb is set to the set of mutation probabilities $X_m$ that makes a corresponding cost function $CF_m$ less than the measured cost function $CF_i$ for any of the sets of mutation probabilities $X_i$, belonging to the swarm of mutation probabilities $[[X]]_g$.

Following the initialization in blocks S611 to S614, a loop process is performed for refining the sets of mutation probabilities $X_i$ in the swarm of mutation probabilities $[[X]]_g$, which ultimately correspond to the global best mutation probabilities gb at the end of the loop. In block S615, first random variable $r_1$ and second random variable $r_2$ are randomized to either 0 or 1. An updated velocity $v_i$ is calculated in block S616 to determine the amount of offset for shifting each mutation probability $X_i$ using the current value of the velocity $v_i$, the inertia component w, the cognitive component $\eta_1$, social component $\eta_2$, the personal best mutation probability pb, the global best mutation probability gb, and the first and second random variables $r_1$ and $r_2$, as shown in Equation (1):

$$v_i = w((v_i + \eta_1 r_1) \cdot (X_i - pb_i) + \eta_2 r_2 \cdot (X_i - gb)) \quad \text{Equation (1)}$$

The refined set of mutation probabilities $X_i$ are calculated in block S617 using the corresponding current set of mutation probabilities $X_i$ and updated velocities $v_i$ as determined by Equation (1), where $X_i = X_i + v_i$. The new cost function $CF_i$ is then calculated based on the refined set of mutation probabilities $X_i$ in block S618 via the interaction between the server and the client.

In block S619, it is determined whether each of the new cost functions $CF_i$ is less than the corresponding cost function value $f_i$. When the new cost function $CF_i$ is less than the cost function value $f_i$ (block S619: yes), the corresponding personal best mutation probability pb is updated to the current set of mutation probabilities $X_i$, and the cost function value $f_i$ is updated to the new cost function $CF_i$ in block S620. When the new cost function $CF_i$ is not less than the cost function value $f_i$ (block S619: no), the personal best mutation probability pb and the interim cost $f_i$ remain unchanged, and the process skips ahead to block S623, discussed below. Accordingly, the personal best mutation probability pb is set to the set of mutation probabilities $X_i$ that corresponds to the lowest cost function $CF_i$ so far.

In block S621, it is determined whether the new cost function value $f_i$ is less than the cost function $CF_m$. When the new cost function value $f_i$ is less than the cost function $CF_m$ (block S621: yes), the global best mutation probability gb is updated to the current personal best mutation probability pb, and the cost function $CF_m$ is updated to the new cost function value $f_i$ in block S622. When the new cost function value $f_i$ is not less than the cost function $CF_m$ (block S621: no), the global best mutation probability gb and the cost function $CF_m$ remain unchanged, and the process proceeds to block S623. Accordingly, the global best mutation probability gb is set to the personal best mutation probability pb that corresponds to the lowest cost function $CF_m$ so far.

It is then determined whether to continue the process for refining the set of mutation probabilities. For example, in block S623, the generation number g is incremented by one, and in block S624, it is determined whether the current generation number g equals (or alternatively exceeds) a predetermined maximum number G. When it is determined that the generation number g does equal the predetermined maximum number G (block S624: yes), the process returns to block S615 to begin the next iteration between blocks S615 and S624. When it is determined that the generation number g exceeds the predetermined maximum number G (block S424: yes), the process is ended, and the results are returned to the process for finding vulnerabilities of the server and the client, e.g., at block S420 in FIG. 4. That is, the global best mutation probability gb is returned as the set of refined mutation probabilities $X_{i+1}$. After the timeout, e.g., at block S421, it is determined whether the client is defective in block S423 using the must current version of the set of refined mutation probabilities provided in block S420.

Figure 7:
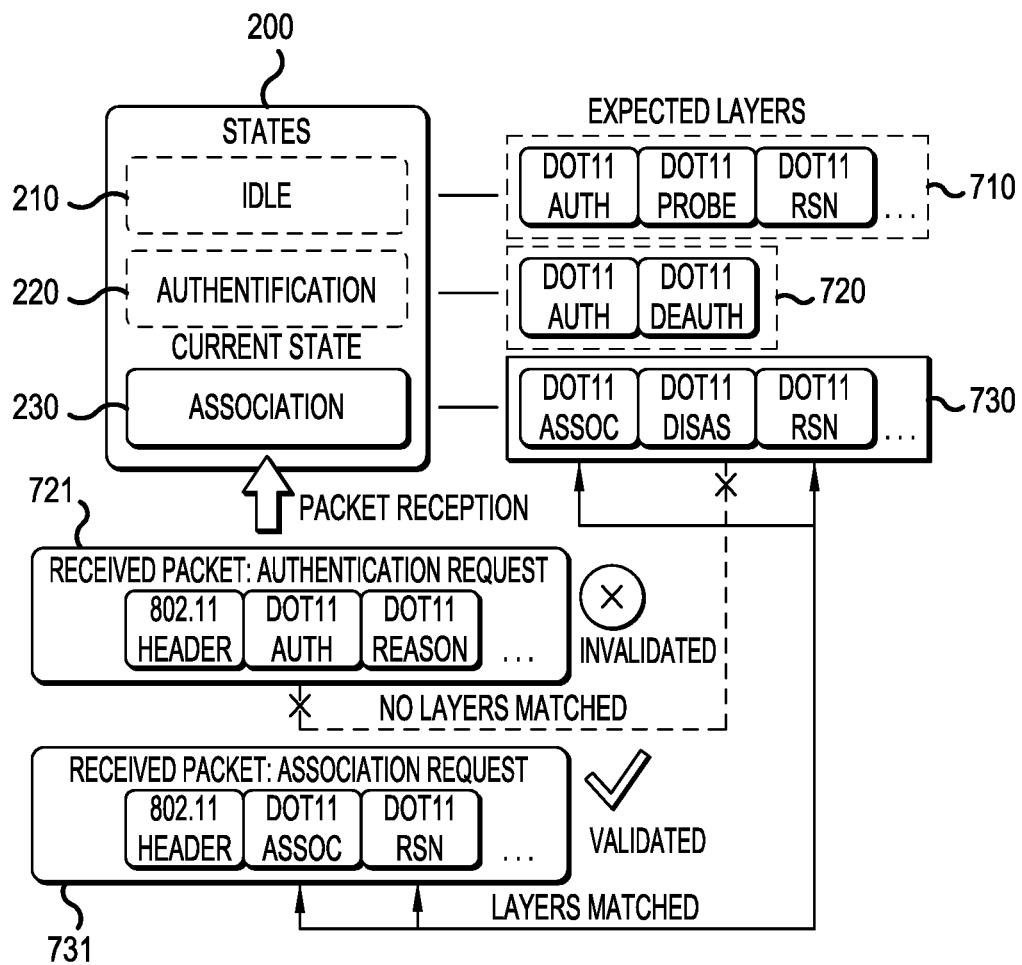
FIG. 7 is a simplified block diagram of a portion of a state machine of a communication protocol model implemented by the server showing illustrative validated and invalidated packets, according to a representative embodiment.

FIG. 7 is a simplified block diagram of a portion of a state machine model implemented by the server showing illustrative validated and invalidated packets, according to a representative embodiment.

Referring to FIG. 7, an example is shown of two packets being validated or invalidated for detecting anomalies in the client, as discussed above with reference to block S417 in FIG. 4. FIG. 7 shows only three states of the state machine 200: idle state 210, authentication state 220, and association state 230. In the depicted example, the current state of the communication protocol model is the association state 230. Next to each of the states are examples of expected layers in an expected packet corresponding to that state. The idle state 210 has an expected packet 710 with expected layers Dot11 Auth, Dot11 Probe and Dot 11 RSN, the authentication state 220 has an expected packet 720 with expected layers Dot11 Auth and Dot 11 Deauth; and the association state 230 has an expected packet 730 with expected layers Dot11 Assoc, Dot11 Disas and Dot 11 RSN, for example. Also in the depicted example, two client packets are received: client packet 721, which is an authentication request packet including layers Dot11 Auth and Dot11 Reason, and client packet 731, which is an association request packet including layers Dot11 Assoc and Dot11 RSN.

Since the state machine is in the association state, the layers of the client packets 721 and 731 are compared to the expected packet 730. Neither of the expected layers Dot11 Auth and Dot11 Reason in the client packet 721 are not compliant with the expected packet 730, and thus the client packet 721 is invalidated and otherwise flagged as an anomaly. (Notably, the client packet 721 would likewise be invalidated in the authentication state 220 since the expected layer Dot11 Reason also does not appear in the expected packet 720.) However, both of the expected layers Dot11 Assoc and Dot11 RSN in the client packet 731 are compliant with the expected packet 730, and thus the client packet 731 is validated.

While the invention has been illustrated and described in detail in the drawings and foregoing description, such illustration and description are to be considered illustrative or exemplary and not restrictive; the invention is not limited to the disclosed embodiments.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method of detecting anomalies of a server and a client communicating according to a communication protocol standard, the method comprising:

establishing a connection between the server and the client according to the communication protocol standard;

generating valid packets from a communication protocol model, the valid packets being compliant with the communication protocol standard;

generating mutated packets by mutating the valid packets according to mutation probabilities assigned to layers and fields of the valid packets, wherein the mutation probabilities indicate respective probabilities of the layers and respective probabilities of the fields within the layers being mutated by the communication protocol model;

sending the mutated packets from the server to the client or from the client to the server during different states of the communication protocol model;

receiving first responses to the mutated packets;

sending invalid packets, retrieved from a history of sent packets, from the server to the client or from the client to the server during different states of the communication protocol model;

receiving second responses to the invalid packets; and identifying an anomaly of the client or the server based on the received first responses and the received second responses.

2. The method of claim 1, further comprising:

optimizing the mutation probabilities based on the received first responses;

generating additional mutated packets by mutating the valid packets according to the optimized mutation probabilities;

sending the additional mutated packets from the server to the client or from the client to the server during different states of the communication protocol model;

receiving additional first responses to the additional mutated packets; and identifying the anomaly of the client or the server further based on the received additional first responses.

3. A method of finding vulnerabilities of a Wi-Fi client communicating with an emulated network access point (AP), the method comprising:

establishing an open Wi-Fi connection between the AP and the Wi-Fi client;

generating a valid packet (P) from a Wi-Fi protocol model, the valid packet being compliant with a Wi-Fi protocol standard, wherein the valid packet comprises a plurality of layers, and each layer comprises a plurality of fields;

generating a mutated packet (P') by mutating the valid packet according to a set of mutation probabilities assigned to the plurality of layers and to the plurality of fields in each of the plurality of layers of the valid packet, wherein the mutation probabilities indicate respective probabilities of the plurality of layers and respective probabilities of the plurality of lds in each of the plurality of layers being mutated by the Wi-Fi protocol model;

sending the mutated packet to the Wi-Fi client;

sending an invalid packet ($P_{inv}$) to the Wi-Fi client, wherein the invalid packet is retrieved from a history of sent packets;

receiving a client packet (Pr) from the Wi-Fi client in response to the mutated packet and the invalid packet;

measuring a cost function indicative of an effectiveness of detecting anomalies based in part on the received client packet;

refining the set of mutation probabilities for optimizing the measured cost function;

generating another mutated packet by mutating another valid packet according to the refined set of mutation probabilities;

sending the another mutated packet and another invalid packet to the Wi-Fi client; and identifying an anomaly of the Wi-Fi client based on a response received from the Wi-Fi client to the another mutated packet and the another invalid packet.

4. The method of claim 3, wherein identifying the anomaly of the Wi-Fi client comprises:

validating the client packet received as the response from the Wi-Fi client by comparing a type of the client packet to an expected type according to the Wi-Fi protocol standard and a state of the Wi-Fi protocol model corresponding to when the client packet is received; and identifying the anomaly of the Wi-Fi client when the type of the client packet does not match the expected type.

5. The method of claim 3, wherein identifying the anomaly of the Wi-Fi client comprises determining whether the response is expected, and when the response is not expected, flagging the response as the anomaly.

6. The method of claim 5, wherein the response is not expected when the response indicates that:

the another invalid packet is not dropped by the Wi-Fi client;

the another mutated packet is not properly handled by the Wi-Fi client; or the another mutated packet received by the Wi-Fi client is valid when it is not.

7. The method of claim 3, wherein the set of mutation probabilities includes mutation probabilities associated with the layers of the valid packet, the fields of each layer, and states of the Wi-Fi protocol model, respectively.

8. The method of claim 7, wherein the set of mutation probabilities comprises:

a layer mutation probability assigned to each layer of the plurality of layers, and a field mutation probability assigned to each field of the plurality of fields in each layer.

9. The method of claim 8, wherein generating the mutated packet further comprises:

modifying the plurality of layers in the valid packet according to the layer mutation probability assigned to each layer; and modifying the plurality of fields in each layer in the valid packet according to the field mutation probability assigned to each field using at least one mutation operator.

10. The method of claim 9, wherein each of the at least one mutation operator comprises:

a random byte operator for assigning a randomly generated value to each byte in the field;

a zero filling operator for overwriting each byte in the field with all zeros; or a bit setting operator for setting a most significant bit in each byte in the field to a high value.

11. The method of claim 10, wherein assigning the layer mutation probability and assigning the field mutation probability is done randomly, is performed by a user, or is based on a common vulnerability exposure (CVE) to a known vulnerability.

12. The method of claim 3, wherein the anomaly comprises at least one of a vulnerability of the Wi-Fi client, or non-compliant behavior of the of the Wi-Fi client with respect to the Wi-Fi protocol standard.

13. The method of claim 3, wherein the cost function comprises a transitions cost function for counting a number of state transitions in the Wi-Fi protocol model, wherein the set of mutation probabilities are refined to maximize the number of state transitions.

14. The method of claim 3, wherein the cost function comprises an anomaly period cost function for capturing an amount of time between the identified anomaly of the Wi-Fi client and a next identified anomaly of the Wi-Fi client, wherein the set of mutation probabilities are refined to minimize the amount of time.

15. The method of claim 3, wherein the cost function comprises an anomaly count cost function for counting a number of identified anomalies of the Wi-Fi client, wherein the set of mutation probabilities are refined to maximize the number of identified anomalies.

16. The method of claim 3, wherein the cost function comprises an iteration time cost function for determining an amount of time taken for the Wi-Fi protocol model to return to an initial state, wherein the set of mutation probabilities are refined to minimize the amount of time.

17. The method of claim 3, wherein the set of mutation probabilities are refined using particle swarm optimization, wherein a swarm of particles comprises the set of mutation probabilities as a particle.

18. The method of claim 17, wherein refining the set of mutation probabilities is influenced by velocity, personal best mutation probabilities, and global best mutation probabilities for the swarm of particles, and wherein the velocity is an offset for modifying the set of mutation probabilities, and personal best and global best mutation probabilities act as memory for directing the refining towards the optimized cost function.

19. The method of claim 3, wherein the invalid packet is invalid with respect to a current state of the Wi-Fi protocol model.

20. A method of detecting anomalies of a network access point (AP) communicating with a client, the method comprising:

establishing an open Wi-Fi connection between the AP and the client;

generating a valid packet (P) from a communication protocol model, the valid packet being compliant with a communication protocol standard;

generating a mutated packet (P') by mutating the valid packet according to mutation probabilities assigned to layers and fields of the valid packet, wherein the mutation probabilities indicate respective probabilities of the layers and respective probabilities of the fields within the layers being mutated by the communication protocol model;

sending the mutated packet to the AP;

sending an invalid packet ($P_{inv}$) to the AP, wherein the invalid packet is invalid with respect to a current state of the communication protocol model and is retrieved from a history of sent packets;
receiving at least one AP packet (Pr) from the AP in response to the mutated packet and the invalid packet;
measuring a cost function indicative of an effectiveness of detecting the anomalies based in part on the received at least one AP packet;
refining the mutation probabilities for optimizing the measured cost function;
generating another mutated packet by mutating the valid packet according to the refined mutation probabilities;
sending the another mutated packet and another invalid packet to the AP; and
identifying an anomaly of the AP based on a response received from the AP to the another mutated packet and the another invalid packet.

* * * * *

UNITED STATES PATENT AND TRADEMARK OFFICE
CERTIFICATE OF CORRECTION

PATENT NO. : 11,349,963 B1
APPLICATION NO. : 16/773689
DATED : May 31, 2022
INVENTOR(S) : Sudipta Chattopadhyay et al.

It is certified that error appears in the above-identified patent and that said Letters Patent is hereby corrected as shown below:

In the Claims

In Column 19, Line 1, in Claim 3, delete "Ids" and insert -- fields --.

Signed and Sealed this
Thirteenth Day of September, 2022

Katherine Kelly Vidal
*Director of the United States Patent and Trademark Office*